United States Patent [19]

Weiniindbrot

[11] Patent Number: 4,574,027

[45] Date of Patent: Mar. 4, 1986

[54] DEVICE FOR AFFIXING ADHESIVE LABELS TO OBJECTS

[75] Inventor: Hübert Weiniindbrot, Hechingen-Stein, Fed. Rep. of Germany

[73] Assignee: Bizerba-Werke Wilhelm Kraut GmbH & Co. KG, Balingen, Fed. Rep. of Germany

[21] Appl. No.: 567,352

[22] Filed: Dec. 30, 1983

[30] Foreign Application Priority Data

Jan. 18, 1983 [DE] Fed. Rep. of Germany ....... 3301439

[51] Int. Cl.[4] ..................... B32B 31/00; G05G 15/00; B44C 1/00; B31F 5/00

[52] U.S. Cl. .................................... 156/352; 156/475; 156/541; 156/542; 156/556; 156/DIG. 37; 156/DIG. 44

[58] Field of Search ................. 156/285, 556, DIG. 2, 156/475, 497, 566, 540, 541, 542, DIG. 38, DIG. 37, DIG. 42, DIG. 45, 352, 358, 584, DIG. 44, DIG. 33, 568

[56] References Cited

U.S. PATENT DOCUMENTS

| | | | |
|---|---|---|---|
| 3,984,279 | 10/1976 | Siryj | 150/DIG. 2 |
| 4,021,293 | 5/1977 | Total | 156/568 |
| 4,025,385 | 5/1977 | Wood | 156/568 |
| 4,148,683 | 4/1979 | Potts | 156/556 |
| 4,390,386 | 6/1983 | Bartl | 156/DIG. 38 |

OTHER PUBLICATIONS

Webster's 9th Collegiate Dictionary "flexible", p. 436.

*Primary Examiner*—Edward Kimlin
*Assistant Examiner*—Louis Falasco
*Attorney, Agent, or Firm*—Leydig, Voit & Mayer, Ltd.

[57] ABSTRACT

The invention relates to a device for attaching adhesive labels to objects comprising a rotatably mounted tubular labelling arm driven by a motor and having a suction head disposed at its free end, this suction head being directly connected via the tubular labelling arm to a vacuum source for the purpose of drawing a label by suction onto the suction head. In order to be able to use such a device, which has a high operating speed, as universally as possible, i.e. for labelling the most varied types of object, the tubular labelling arm bearing the suction head is designed to be bendably elastic and rotate in a single direction of rotation.

11 Claims, 11 Drawing Figures

DEVICE FOR AFFIXING ADHESIVE LABELS TO OBJECTS

The invention relates to a device for attaching adhesive labels to objects comprising a tubular labelling arm, which is rotatably mounted and driven by a motor, and a suction head mounted on the free end of this arm, this suction head being adapted for connection to a vacuum source via the tubular labelling arm for the purpose of drawing a label onto the suction head by suction.

Devices of this type primarily serve the purpose of labelling packed or unpacked goods, in particular in the food sector. Printed on the labels used are details such as producer, date of manufacture and date of sale, weight, price etc.

Known labelling devices must be adjusted each time to the size of the object to be labelled and the position of the label on the surface of the object. For this reason, they can often not be used for reliable and uniform labelling of objects passing the device one after the other when these objects are of varying sizes and/or the labels are to be placed in varying positions on them.

The object of the invention is to improve a device of the type in question such that it is universally suited for use in labelling objects of varying sizes and shapes without any complicated adjustments having to be made.

The object is accomplished according to the invention in that the tubular labelling arm bearing the suction head is designed to be bendably elastic and rotates in a single direction of rotation.

Figure 1:
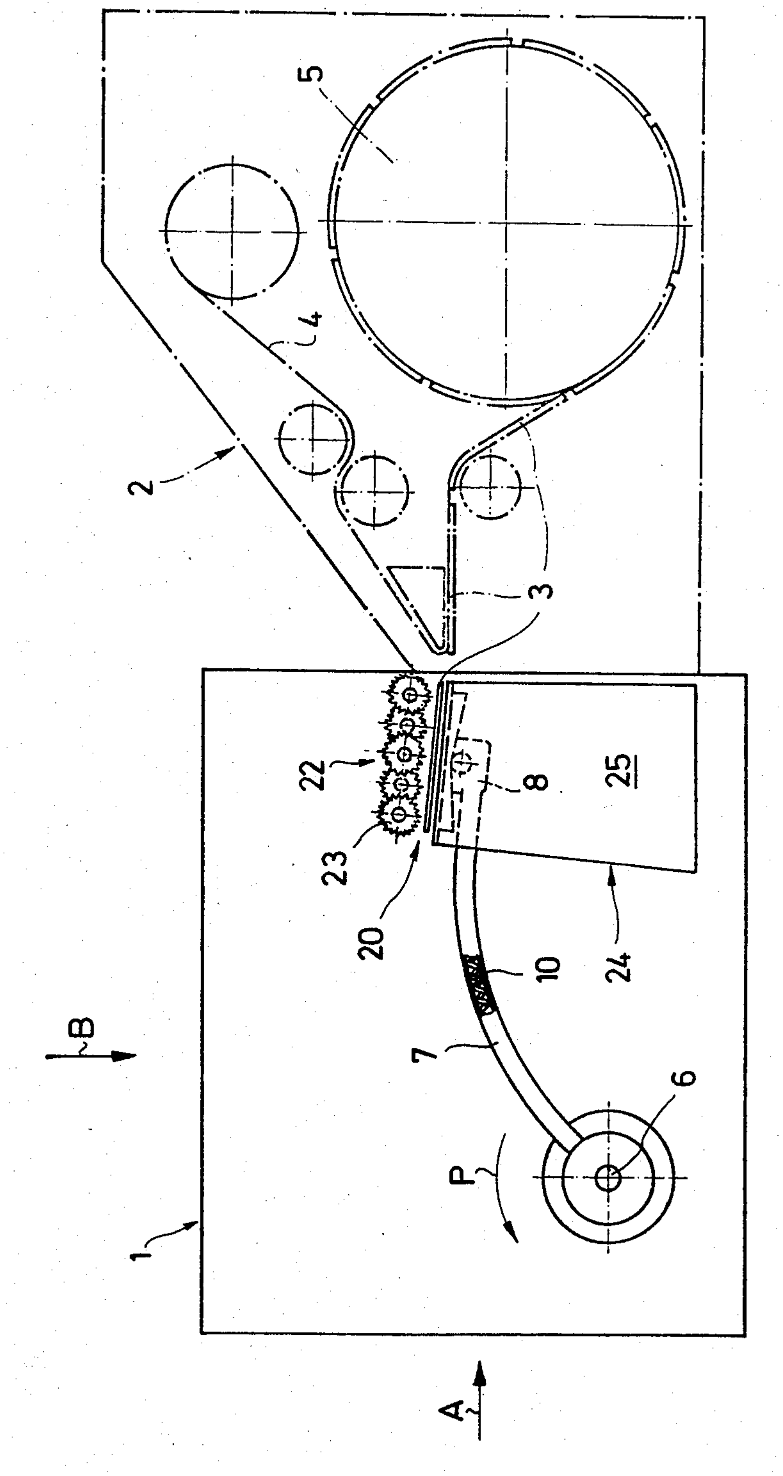
Figure 2:
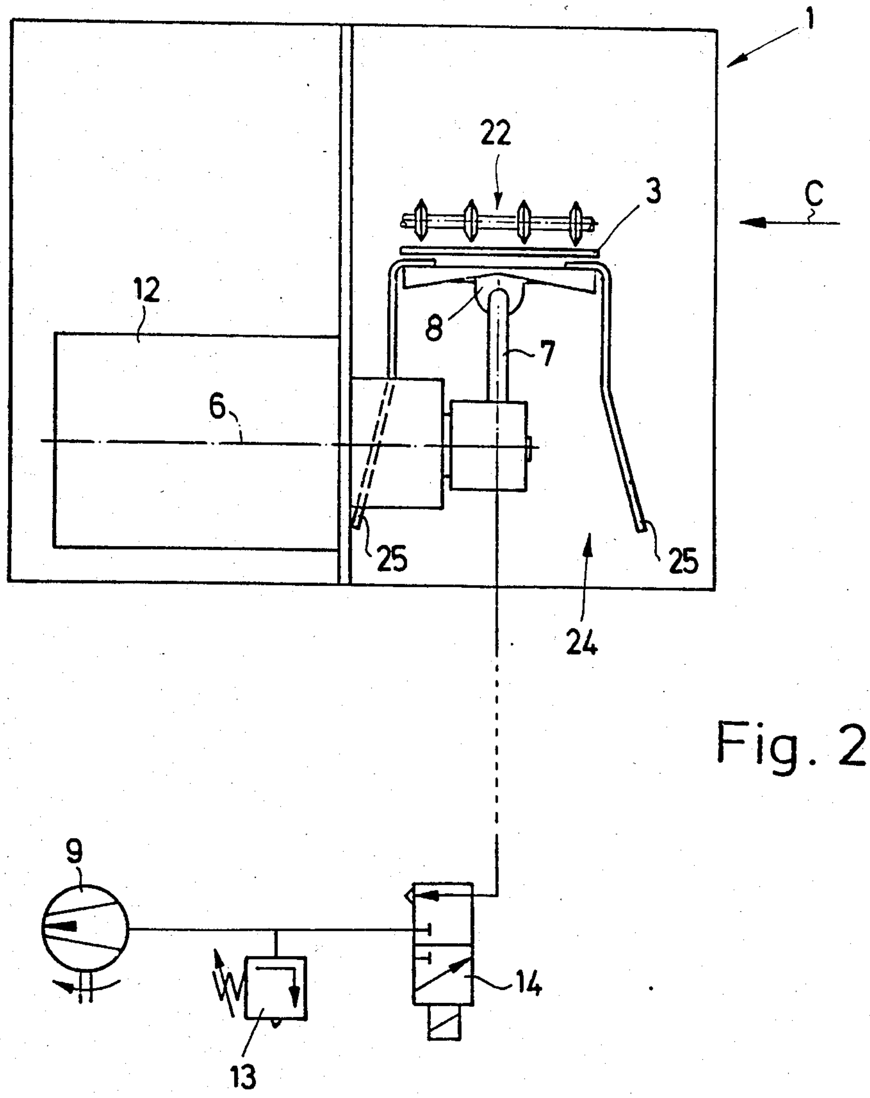
Figure 3:
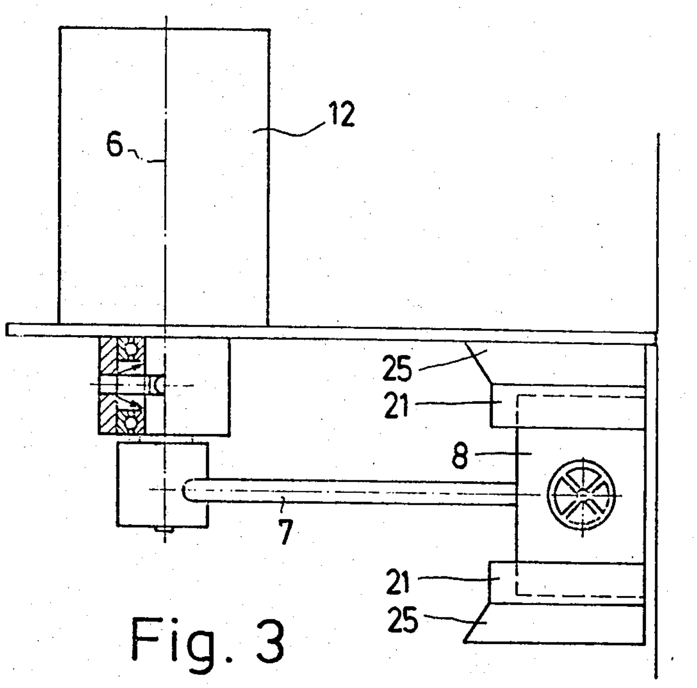
Figure 4:
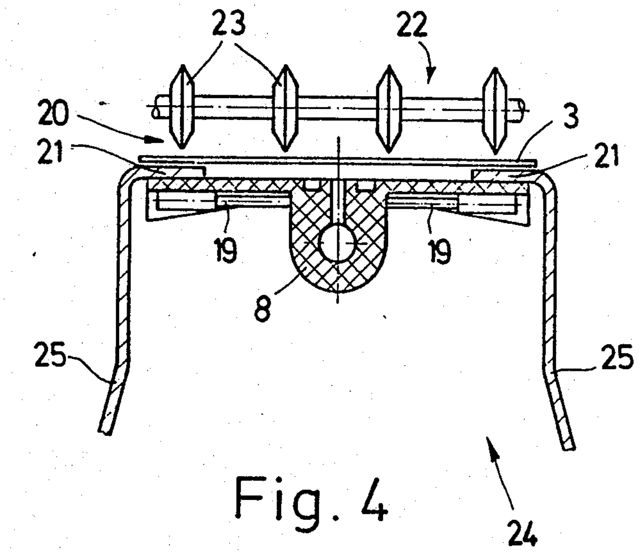
Figures 5, 6, 7:
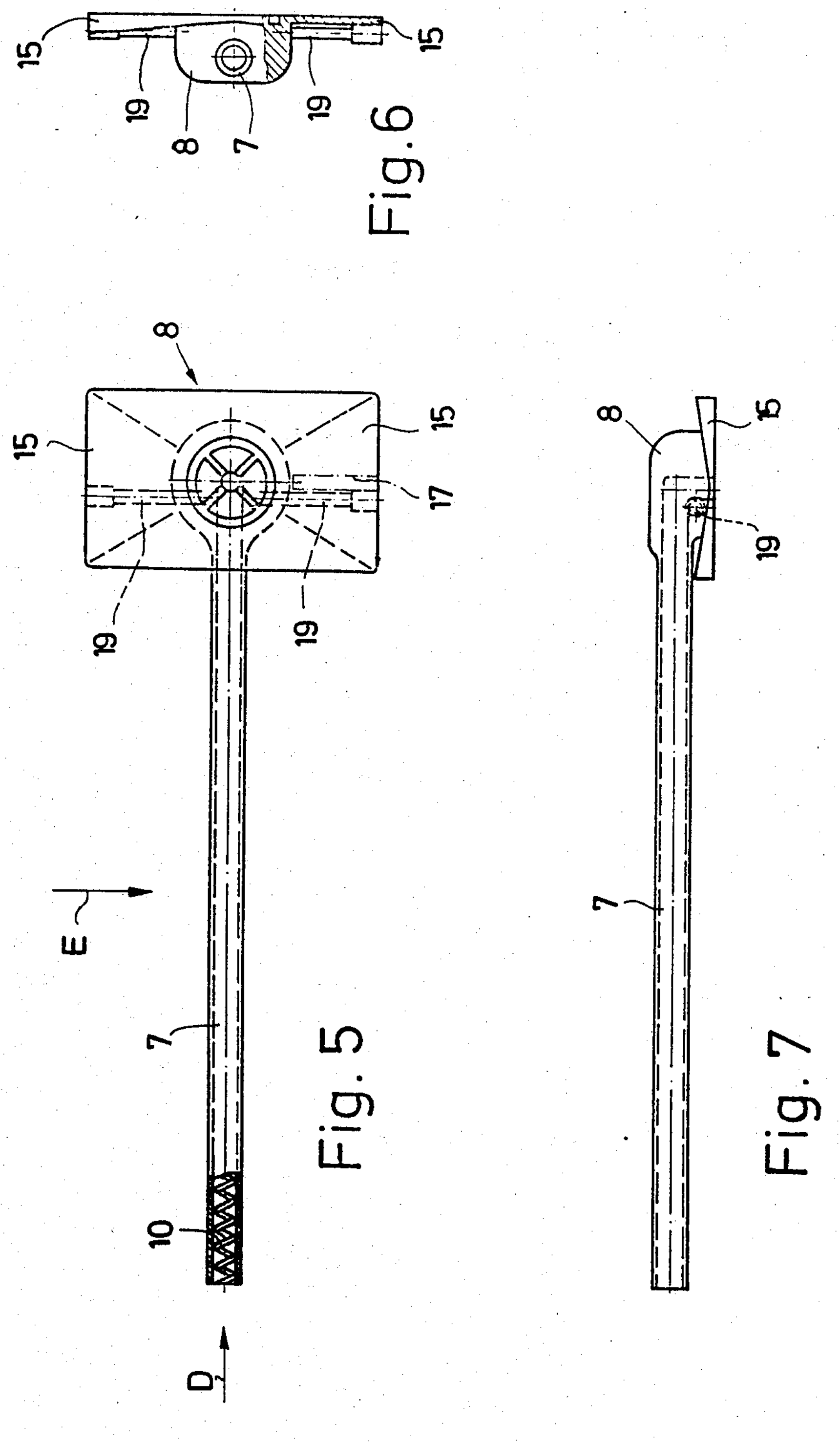
Figure 8:
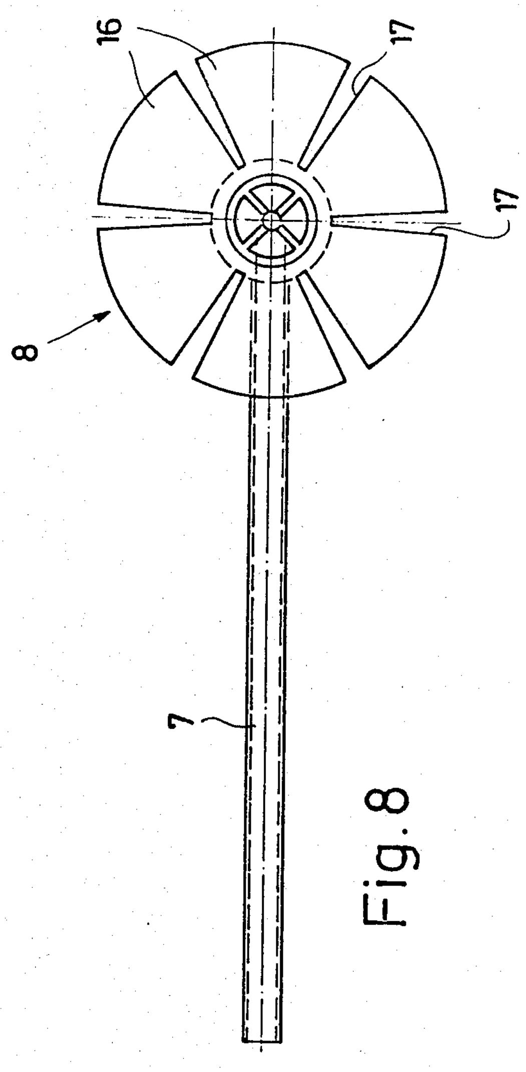
Figure 9:
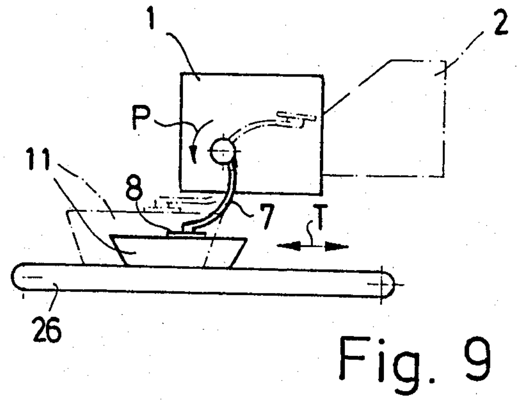
Figure 10:
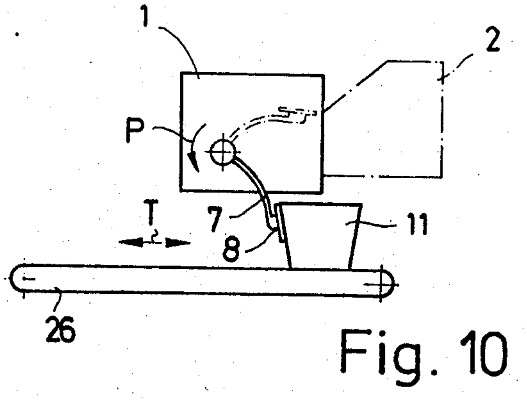
Figure 11:
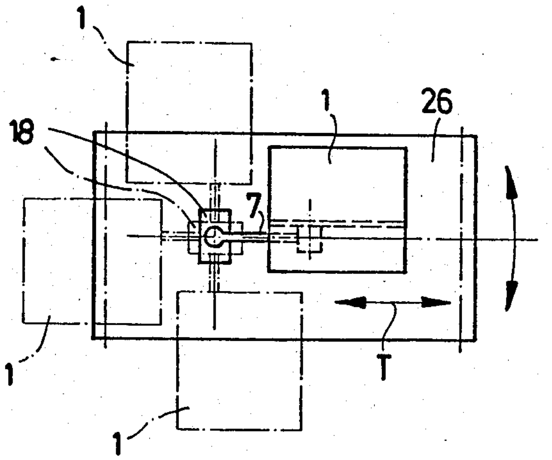

The following description of preferred embodiments of the invention serves to explain this invention further in conjunction with the attached drawings, which show:

FIG. 1 a schematic side view of a labelling device with associated label dispenser;

FIG. 2 a front view of the device in the direction of arrow A in FIG. 1 with a schematic illustration of a vacuum means;

FIG. 3 a plan view of the device in the direction of arrow B in FIG. 1;

FIG. 4 an enlarged sectional view of a detail in accordance with arrow C in FIG. 2;

FIG. 5 a plan view of a labelling arm;

FIG. 6 a partially cut-away view in the direction of arrow D in FIG. 5;

FIG. 7 a side view in the direction of arrow E in FIG. 5;

FIG. 8 a plan view of a modified embodiment of a labelling arm;

FIG. 9 a schematic illustration of the labelling device of FIG. 1 when labelling objects of varying heights;

FIG. 10 a schematic illustration of the labelling device of FIG. 1 when labelling the side face of an object and FIG. 11 a schematic plan view of the labelling device in various positions relative to a conveyor belt transporting the objects to be labelled.

FIG. 1 shows a labelling device 1 associated with a label dispenser 2 which is known per se. The printed labels 3 are kept ready for use on a carrier strip 4 wound on a supply roll 5. The self-adhesive label 3 will be withdrawn in the usual way from the strip 4 in the dispenser 2 and held ready for use.

The labelling device 1 is disposed immediately adjacent the dispenser 2 so that a label 3 withdrawn from the strip 4 will automatically assume the position in the device 1 shown in FIG. 1.

The device 1 comprises in detail a labelling arm 7 rotatably mounted at 6, a suction head being secured to its free end. The labelling arm 7 is tubular in design and connected at its end adjacent the axis of rotation 6 with a vacuum or low-pressure source 9 so that a vacuum is generated in the suction head 8 immediately below the label 3 held above it. As a result of this vacuum the label will be held in the customary way on the suction head such that its adhesive underside faces upwards.

The labelling arm 7 rotatably mounted at 6 is driven by a motor 12 (FIGS. 2 and 3) in the direction of arrow P so that it rotates only in this direction.

The labelling arm 7, which is preferably designed to be a straight line (FIGS. 5, 7 and 8), is made of a bendable elastic material, for example plastic or rubber, so that it can assume a curved shape in the basic position shown in FIG. 1, in which it receives the label 3. For the sake of strengthening, the elastic, hose-like labelling arm 7 contains a coil spring 10, preferably made of metal, which increases the rigidity of the arm 7 and prevents any decrease in or closure of its inside cross section, which may be caused by the prevailing vacuum or by the arm 7 being squeezed together when it is deformed to too great an extent.

The labelling arm 7 will rotate immediately after receiving the label. While the labelling arm 7 is in the course of a full rotation the next label 3 will be made ready for use in the dispenser 2. The label 3 will be attached to the object 11 to be labelled once the arm 7 has rotated through approximately 180° or 270° depending on the desired positioning of the label 3 on the upper face or a side face of the object 11 (FIGS. 9 and 10). During this procedure the labelling arm 7 will be driven by the motor 12 without interruption so that the arm 7 will continue to rotate in the same direction until it reaches its basic position again. The fact that the arm continues to rotate in the same direction after labelling and with a preferably constant rotational speed is made possible by the flexible pliability of the arm 7. Due to this characteristic the arm 7 will bend (FIGS. 9 and 10) during and after application of the label 3 to the object 11 accordingly and the suction head 8 carried by the arm 7 can slip past the object 11, once labelling is completed, and return to the basic position. Shortly before the label 3 impacts on the object 11 the vacuum prevailing in the suction head 8 is switched off so that the label can be easily detached from the suction head 8 as soon as it begins to adhere to the object.

The motor 12 is preferably designed as a stepping motor or customary direct-current motor and provided with a tachogenerator.

Via a vacuum switch 13 (FIG. 2), which is preferably installed directly at the point of rotation of the labelling arm 7, a control is kept on whether each label 3 is actually drawn onto the suction head 8 and transported to the object 11. If the pre-adjusted vacuum level is not reached due to the absence of a label the drive motor 12 is not switched on and the fault indicated optically or acoustically by a fault indication. This ensures that, in continuous operation, every object passing the labelling device 1 is labelled. Errors, which may, for example, occur due to patches with inadequate adhesive, are immediately recognized as faults.

A vacuum valve 14 (FIG. 2) controlled and timed accordingly switches the vacuum in the suction head 8 on and off.

The suction head 8, which is preferably made of the same material as the labelling arm 7, has pressing or contacting wings 15, 16 (FIGS. 5 or 6), the outer contours of which are adjusted to the shape of the label to be attached (square or round). The pressing wings 15, 16, which project laterally of the suction head can also be subdivided by slits 17 (cf. FIG. 8 and the dot-dash line represented in FIG. 5).

The suction head 8 together with its pressing wings 15, 16 can be produced integrally with the flexible labelling arm 7 and from elastic material having as low a specific weight as possible. Due to the elastic flexibility of the tubular arm 7 the suction head 8 may also be pivoted and swivelled laterally. In this way the labels 3 may also be attached to inclined surfaces and to extremely uneven surfaces of the objects, for example to sausages having a diameter of less than 40 mm, and still fit optimally and snugly on such surfaces. The pressing wings 15, 16 are, in the preferred embodiment of the invention, thicker towards their outer edges so that the corners and edge areas of the labels 3 are pressed well against the objects.

In addition, laterally protruding stop pins 19 are, at least in the case of the rectangular embodiment of the pressing wings 15 according to FIGS. 4 to 7, disposed on the side facing away from the label 3, i.e. behind the pressing wings 15. During the fast rotation of the labelling arm 7 from its basic position towards the object 11 the stop pins 19 prevent the pressing wings from springing back contrary to the direction of motion. The stop pins 19 also see to it that the adjusting and positioning of the labelling arm 7 in its basic position are exact and reproducible.

Associated with this basic position, which is illustrated in FIG. 1, is a pick-up station 20 with two stop bars 21. The label 3 fed from the dispenser 2 rests on these stop bars. The edge areas of the pressing wings supported by the stop pins 19 extend a certain way along the underside of the bars 21, particularly after the label 3 has been drawn onto the suction head. Above the stop bars 21 and the label 3 positioned on them an arrangement of rollers 22 is provided in the form of a so-called "roller conveyor" which consists of a number of small, freely rotating rollers 23 with toothed circumferences. This roller arrangement has the task of keeping the space between the suction head 8 and the label 3 held ready in the pick-up station as small as possible in order to ensure that the label is properly drawn onto the suction head.

The labelling arm 7 is additionally pretensioned while the suction head 8 travels along the stop bars 21, cf. the curved shape of the arm 7 illustrated in FIG. 1. Once the suction head 8 has detached itself from the stop bars 21 a catapulting or whiplash effect, which is superimposed on and unidirectional with the rotation of the arm 7, will occur due to the release of tension on the labelling arm 7. This will also have an advantageous effect on the optimum adhesion of the label 3 on uneven surfaces of the objects to be labelled. The specific contact pressure acting on the object to be labelled does, however, remain very slight since the labelling arm 7 is designed to be very low in mass. This will avoid any damage to objects sensitive to pressure.

A further component of the pick-up station 20 is a centering shaft 21. This centering shaft has catching surfaces 25 disposed at right angles to the stop bars 21 and partially inclined to the plane of rotation of arm 7. They trap, so to speak, the rotating arm 7 as it returns to its basic position and guide it into the exact position, in which the label 3 is drawn by suction onto the suction head. The catching surfaces 25, which are preferably designed to be integral with the stop bars 21, consist preferably of sheet metal shaped accordingly.

The objects 11 to be labelled are brought to the labelling device 1 preferably with the aid of transport means, in particular a conveyor belt 26 (cf. FIGS. 9, 10 and 11). The direction of transport T can, in the Figures specified, run from left to right or from right to left. Dependent on the shape and arrangement of object 11 and label 3 relative to each other as well as on the "direction" in which the label is to be read it is often necessary for the labels 3 to be affixed to the object 11 in any optional direction (preferably 90°, 180°, 270°) relative to the direction of transport T. For this purpose, the entire labelling device 1 can be mounted for rotation, in accordance with FIG. 11, through any angle (preferably 90°, 180°, 270°) relative to the direction of transport T. In addition, it is also possible to mount the device 1 for lateral displacement in or perpendicularly to the direction of transport T. The longitudinal side of the rectangular pressing wings 15 can also extent, in contrast to FIG. 5, parallel to the axis of arm 7, which is indicated in FIG. 11 by reference numeral 18.

As a result of the fast labelling speed achievable with the described device, which can be in the region of 0.3 to 1 sec., the device is able to position the labels 3 exactly on the objects 11 continuously passing the device 1 even when the plane of rotation of the labelling arm 7 runs transversely to the direction of transport T.

An essential feature of the invention is, apart from the resilient, flexible design of the labelling arm 7, the fact that it always rotates in the same direction and preferably at a constant speed. In contrast to known, reciprocable labelling arms the advantage of this construction is that no special means are necessary for reversing the direction of rotation. The device therefore has a more simple construction and operates more quickly. Due to the flexibility of the labelling arm 7 differences in the height of the objects 11 to be labelled—up to, for example, approximately 13 cm—are automatically compensated. A special height adjustment of the entire device 1 is not normally required. If the labelling arm 7, which is normally, for example, about 20 cm in length, is designed to be correspondingly longer it is possible to compensate for even greater differences in the height of the objects to be labelled without any special height adjustment of the entire device 1 being necessary.

The resilient strengthening of the labelling arm 7 by the coil spring 10 enables an almost constant pretensioning of the arm in the pick-up station 20 and a steady pressure force when affixing the labels 3 to the objects 11 to be achieved. The spring 10 also contributes to realization of the catapult or whiplash effect which is useful for attachment of the labels 3.

Three functions are fulfilled by the special construction of the centering shaft 24 with the lateral catching surfaces 25: arresting the suction head 8 carried by the labelling arm 7, guiding the label 3 during its transfer from the label dispenser 2 and maintaining a constant distance between label 3 and suction head 8 while the label is being drawn by suction onto the suction head.

An additional advantage of the invention is the fact that control of the vacuum by the vacuum switch 13 is carried out in the short time between the labelling arm 7 leaving the pick-up station 20 and the label impinging on the object 11, i.e. without any additional time being necessary. It is possible to ascertain each time whether the relevant label has actually been drawn onto the suction head and transported.

I claim:

1. Device for attaching adhesive labels to objects comprising a labelling arm, which is rotatably mounted and driven by a motor, and a suction head mounted on the free end of said arm, said suction head being connected to a vacuum source via a hollow suction tube for the purpose of drawing a label by suction onto the suction head, characterized in that the hollow suction tube forms the labelling arm supporting the suction head, the tube forming the labelling arm and supporting the suction head is formed from an elastically bendable material, the end of the tube opposite the end bearing the suction head is rotatable about an axis of rotation, the motor rotates the tube about said axis in a single direction, and the suction head also consists of a bendable elastic material.

2. Device according to claim 1, characterized in that the labelling arm is strengthened inside by a coil spring.

3. Device according to claim 1, characterized in that said suction head has at least two flexible pressing wings.

4. Device according to claim 3, characterized in that the thickness of said pressing wings increases towards their free edges.

5. Device according to claim 3, characterized in that said pressing wings are subdivided by slits.

6. Device according to claim 3, characterized in that at least one stop pin extending perpendicularly to the plane of rotation of said labelling arm is disposed on said suction head in order to support its pressing wings.

7. Device according to claim 1, characterized in that a centering shaft is provided for guiding said suction head into its basic position, in which it receives the label, said shaft having catching surfaces inclined relative to the plane of rotation of said labelling arm and stop bars projecting inward from said surfaces.

8. Device according to claim 1, characterized in that said suction head in its basic position is spaced from and disposed below an arrangement of rollers.

9. Device according to claim 1, characterized in that a vacuum sensing switch is disposed in the vacuum pipe leading to said suction head, at the point of rotation of said labelling arm, said vacuum sensing switch being responsive to the absence of a label on said suction head in its basic position and switching off the drive motor of said labelling arm as well as, if necessary, switching on a fault indication.

10. Device according to claim 1, characterized in that it is mounted for rotation relative to the direction of transport of the objects to be labelled.

11. Device according to claim 1, characterized in that it is mounted for lateral displacement in or perpendicularly to the direction of transport.

* * * * *